United States Patent [19]

Goehl et al.

[11] Patent Number: 4,608,172

[45] Date of Patent: Aug. 26, 1986

[54] PLASMAPHERESIS MEMBRANE AND PROCESS FOR THE PREPARATION THEREOF

[75] Inventors: Hermann J. Goehl, Zimmern-Bisingen; Reinhold J. Buck, Alleshausen, both of Fed. Rep. of Germany

[73] Assignee: Gambro Dialysatoren KG, Fed. Rep. of Germany

[21] Appl. No.: 668,696

[22] Filed: Nov. 6, 1984

Related U.S. Application Data

[63] Continuation of Ser. No. 341,090, Jan. 20, 1982, abandoned, which is a continuation-in-part of Ser. No. 280,472, Jul. 6, 1981, abandoned.

[30] Foreign Application Priority Data

Jul. 25, 1980 [SE] Sweden .............................. 80053804

[51] Int. Cl.$^4$ .............................................. B01D 13/00
[52] U.S. Cl. .................................. 210/500.2; 210/654; 210/500.28
[58] Field of Search ............. 210/490, 491, 654, 500.2

[56] References Cited

U.S. PATENT DOCUMENTS

| | | | |
|---|---|---|---|
| 3,615,024 | 10/1971 | Michaels | 210/500.2 X |
| 3,945,926 | 3/1976 | Kesting | 210/500.2 |
| 3,957,651 | 5/1976 | Kesting | 210/500.2 X |
| 4,032,309 | 6/1977 | Salemme | 55/158 |
| 4,247,498 | 1/1981 | Castro | 264/49 X |
| 4,279,752 | 7/1981 | Sueoka et al. | 264/49 X |

OTHER PUBLICATIONS

Porter, et al.; "Membrane Ultrafiltration"; 1–1971; 8 pp.

*Primary Examiner*—Frank Spear
*Attorney, Agent, or Firm*—Lerner, David, Littenberg, Krumholz & Mentlik

[57] ABSTRACT

Plasmapheresis membranes of hydrophilic polycarbonates are disclosed, comprising polycondensates of bisphenol A and a polyalkylene oxide. These membranes which have a regular pore structure with smoothly rounded pores with openings without sharp edges, have an average pore diameter of about 0.01 to 0.8$\mu$, a porosity preferably above 65%, and a thickness of between about 50 and 300$\mu$. Processes for preparing these membranes are also disclosed, including casting a 3 to 20 weight percent polycarbonate polymer solution onto a smooth surface, contacting the layer with a gelling medium prior to precipitation of the membrane, and subsequent precipitation of the gelled layer to form the membrane.

10 Claims, No Drawings

PLASMAPHERESIS MEMBRANE AND PROCESS FOR THE PREPARATION THEREOF

CROSS-REFERENCES TO RELATED APPLICATIONS

This is a continuation of application Ser. No. 341,090 filed on 1/20/82, which is a continuation-in-part of application Ser. No. 280,472 filed on 7/6/81 (both now abandoned).

FIELD OF THE INVENTION

The present invention relates to a microporous membrane of biocompatible polymer for use in plasmapheresis.

More particularly, the present invention relates to a process for the preparation of such a membrane, wherein a solution of the biocompatible polymer is applied in the form of a layer upon a smooth surface and, thereafter, is precipitated and washed so as to form said membrane.

BACKGROUND OF THE INVENTION

The expression "plasmapheresis" is intended to mean a blood separation procedure in which blood cells are separated from plasma by means of a membrane which is permeable to the plasma but which retains, i.e., is not permeable, to the blood cells. Such a procedure differs from other similar types of blood separation procedures, such as hemofiltration, with respect to the cut-off point with regard to the passage of molecules for the specific membrane which is utilized therein. In hemofiltration, for example, that cut-off point is usually of the order of magnitude of $10^3-5\times10^4$ Dalton, while the corresponding cut-off point in connection with plasmapheresis is about $3\times10^6$ Dalton.

In the literature various membranes (as well as processes for their preparation) are described which are of the above-mentioned kind. For example, in Trans. Am. Soc. Artif. Inter. Org. 1978, pp. 21–26 the use of a hydrophobic polycarbonate membrane having pores which are formed through neutron radiation and etching in association therewith is described. This membrane displays a regular pore structure, but has a low porosity. Furthermore, the pore openings comprise a sharp edge which may cause the destruction of blood cells (hemolysis), when such membranes are used in plasmapheresis. Furthermore, due to its low porosity as well as the polymeric characteristics thereof, said membrane also has a low filtration capacity, such as about 0.004 ml/sec. x at x cm$^2$.

In the above-noted article, as well as in DE-OS 22 57 697 and DE-OS 28 28 616, plasmapheresis membranes which are prepared from cellulose acetate are described, both in the form of hollow fibers and in the form of flat sheets. Again, however, there is also a risk of hemolysis with these membranes. A further disadvantage in connection with these prior membranes is the fact that they have a low permeability for substances having molecular weights of between $1\times10^6$ and $3\times10^6$ Dalton. For example, the permeability coefficient for factor VIII (having a molecular weight of $2\times10^6$) is as low as 0.2–0.4. Furthermore, the Nieviny coefficient for high molecular weight substances (above about 500,000 Dalton) drastically decreases after filtrations for about 15 to 30 minutes.

In British Pat. No. 1,556,898 a polycarbonate membrane is described for use in hemodialysis. These hemodialysis membranes are prepared from polymers having recurring units of the formula

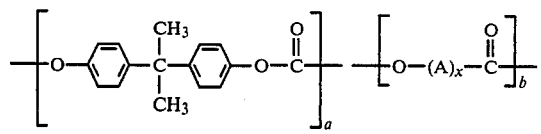

in which A can be —CH$_2$CH$_2$O— or —CH$_2$CH$_2$O— and/or —C$_3$H$_6$O—, etc. The membranes discussed in this patent are useful in connection with hemodialysis, and thus by definition must have pore sizes which are quite small and which can only pass molecular sizes of up to about 20,000 Dalton. Specifically, they have pore sizes of up to about 0.008$\mu$ (about 80 Å), i.e., between about 0.002 and 0.008$\mu$. Furthermore, these membranes have hydraulic permeabilities generally of between about 2 and 6 ml/hr/m$^2$/mmHg. Furthermore, the membranes set forth in this patent are prepared by a wet phase inversion technique employing an aqueous gelation system with water as the gelling medium and a water-miscible organic solvent as the casting solvent. These polycarbonate membranes are thus prepared by casting a layer of the polyether-polycarbonate block copolymer onto a smooth substrate surface with a water-miscible organic solvent, together with a co-solvent which acts as a swelling agent for the copolymer, then drying that layer to partially evaporate the solvents and immersing the partially dried layer in water to form a gelled membrane which can then be stripped from the substrate surface. The preferred solvents used therein are 1,3-Dioxolane, 1,3-Dioxan, 1,4-Dioxan, dimethyl formamide, pyridine, and several others. The additional swelling agents can include dimethyl formamide, dimethyl acetamide, acetamide, formamide, pyridine, etc.

In the procedure set forth in patents such as the above-noted British patent, the evaporation step is important to partially remove the solvent and form a dense membrane structure. The membrane can then be immersed in the water bath to both gell and precipitate same, and during this entire procedure the solvent is completely removed from the membrane.

Furthermore, in a recent patent application, Ser. No. 257,929, filed on Apr. 23, 1981 assigned to Gambro Inc., modified polycarbonate membranes are disclosed for use in hemofiltration processes. These membranes are similar to those set forth above, but are produced by a process which permits the membrane to be used in hemofiltration processes, and have ultrafiltration rates of at least about 7 ml/hr/m$^2$/mmHg. These membranes, like those of the aforementioned British patent, have pore sizes of up to about 0.008$\mu$, i.e. between about 0.002 and 0.008$\mu$. In the procedure disclosed in this co-pending application, the layer of polyether-polycarbonate block copolymer and water-miscible organic solvent are again dried by partial evaporation of the solvent subsequent to casting, and prior to immersion in water to gell the membrane. In one embodiment of that invention, an aqueous solution of an oxidizing agent is contacted with the membrane either subsequent to gelation or as part of the gelation process itself, while in yet another embodiment subsequent to gelation and precipitation of the membrane the gelled membranes are treated with swelling agents, such as glycerine or other polyols or polyethylene glycols, and/or mixtures of these compounds with various alcohols.

One of the objects of the present invention is therefore to provide a microporous membrane of a biocompatible polymer comprising a hydrophilic polycarbonate for use in plasmapheresis, which in contrast to the above-noted prior art membranes displays a regular pore structure comprising smoothly rounded pore openings without sharp edges. Furthermore, it is another object of this invention to provide such membranes having a high permeability or filtration capacity for high molecular substances of up to $3 \times 10^6$ Dalton, to therefore also provide a high filtration rate for plasma, without drastically decreasing permeability coefficients.

A further object of this invention is to provide a process for the preparation of such an improved membrane for plasmapheresis.

SUMMARY OF THE INVENTION

These and other objects have now been achieved by the discovery of a microporous membrane of a biocompatible polymer. Said membrane is characterized in that said polymer is a hydrophilic polycarbonate.

In particular, the plasmapheresis membranes according to the present invention are microporous hydrophilic polycarbonate polymers comprising a polycondensate of bisphenol A and polyalkylene oxide having an average pore diameter of between about 0.01 and $0.8\mu$ whereby the membrane is permeable by molecules of about 50,000 Dalton, and up to about $3 \times 10^6$ Dalton. In particular, in a preferred embodiment the pores of the membrane are smoothly rounded and substantially free of sharp edges whereby hemolysis is substantially avoided when these membranes are employed for plasmapheresis. In particular, it is preferred that these membranes have an average pore diameter of about $0.6\mu$, and preferably have a porosity above about 65%, and a thickness of between about 50 and $300\mu$.

In accordance with the process of the present invention, plasmapheresis membranes are prepared by initially preparing a solution of from about 3 to 20 weight percent of a biocompatible, polycarbonate polymer, comprising a polycarbonate bisphenol A and polyalkylene oxide, applying a layer of that solution to a smooth surface, contacting the layer of solution with a gelling medium prior to precipitation of the membrane from the biocompatible polymer, thereafter precipitating the gelled layer of the solution so as to form the membrane therefrom, and washing the membrane.

In accordance with another embodiment of the process of the present invention, the contacting of the layer of the solution of biocompatible polymer with the gelling agent is conducted without any intermediate drying of that layer subsequent to its application to the smooth surface.

In accordance with another embodiment of the process of the present invention the solution of biocompatible polymer includes two solution components, an aromatic solvent component for the polymer and a non-solvent component for the polymer. Preferably, the solvent for the polymer can include compounds such as dioxane, dioxylane, dimethyl sulfoxide, dimethyl formamide, etc. Furthermore, the non-solvent for the polymer can include compounds such as polyalkylene oxides, salts, glycerine, polyvinyl pyrrolidone, etc.

In accordance with another embodiment of the process of the present invention, the gelling medium employed includes a pair of gelling medium components, the first being a polar solvent for the polymer and the second being an alcohol. In a preferred embodiment, the polar solvent comprises dimethyl formamide and the alcohol used will be methanol.

In accordance with another embodiment of the process of the present invention, the membrane is post-treated after it is precipitated by subsequent contact with an alcohol, followed by contact with a mixture of an alcohol with glycerine. In a preferred embodiment after this two stage contacting the alcohol is evaporated at reduced temperatures so that the glycerine is not removed from the membrane and the membrane is therefore made shelf stable by the presence of the glycerine therein.

DETAILED DESCRIPTION

Examples of hydrophilic polycarbonates which can be used in accordance with the present invention are polycondensates of bisphenol A and polyalkylene oxide. For example, said polycondensates may be represented by the following general chemical formula:

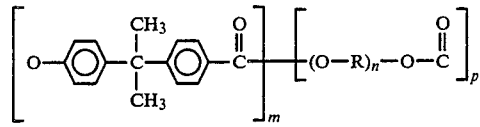

where R is —$CH_2CH_2$— or combinations of —$CH_2$—$CH_2$—$CH_2$— and —$CH_2$—$CH_2$—, but preferably —$CH_2CH_2$, and where m is from about 40 to 100, preferably about 80, n is from about 10 to 155, preferably about 152, and p is from about 0.5 to 3, preferably about 1.

Preferably, the polycondensate is the polycondensation product of bisphenol A and a polyalkylene oxide having a molecular weight of from about 600 to 20,000 Dalton. Said polyalkylene oxide is thereby used in amounts ranging from about 5 to 40, preferably about 35.

Conveniently, the present membrane has an average pore diameter of from about 0.01 to $8\mu$, preferably 0.1 to $0.8\mu$, and more preferably about $0.6\mu$. Furthermore, its porosity is usually about 65%, so as to insure high filtration rates.

The membrane thickness may vary as desired, but is generally from about 50 to $300\mu$. Preferably, the thickness of the membrane is about $100\mu$.

In the present process a hydrophilic polycarbonate, preferably having the above chemical formula, is employed as the biocompatible polymer.

The polymer solution preferably includes an aromatic solvent, or mixtures of such solvents, and a non-solvent, and the hydrophilic polycarbonate is generally present in amounts ranging between about 3 and 20% by weight, preferably between about 3 and 15% by weight, and most preferably between about 3 and 10% by weight. The non-solvent is used in amounts of up to about 15%, such as between about 1 and 6%.

Examples of the aromatic solvents which may be used are dioxane, dioxolane, dimethyl sulfoxide (DMSO), dimethyl formamide (DMF), and mixtures thereof. Examples of the non-solvents which may be used are the polyalkylene oxides, a salt, glycerine, polyvinyl pyrrolidone (PVP), etc.

The viscosity of the polymer solution is usually between about 200 and 20,000 cP, and preferably about 700 cP, measured at 20° C.

The polymer solution is preferably applied to the smooth surface by casting same with a casting gap having a height which is pre-set to a suitable value which depends upon the desired final membrane thickness. Preferably, dust-free conditions, with nitrogen, are utilized for application of the polymer solution, and this is done at a constant temperature, such as from about 10° to 25° C.

Alternatively, the polymer solution may be extruded in the form of a hollow fiber by using special center-liquids which are simultaneously extruded through the center cavity of the die which is utilized.

In accordance with one aspect of the present invention, a mixture of a polar solvent and an alcohol is used as the gelling medium. For example, DMF may be used as the polar solvent, and methanol may be used as the alcohol. The mixing ratio between the DMF and methanol may vary between about 2:1 and 1:2, and preferably will be about 1:1.

The temperature of the gelling medium is generally suitably maintained at from about 15° to 25° C., most preferably about 21° C.

In order for the finished membrane to exhibit shelf-stable characteristics, the membrane can be exposed to a post-treatment. Such post-treatment can comprise sequential treatments with alcohols and an alcohol/glycerine mixture. The alcohol is then removed from the membrane so as to leave glycerine, making the membrane shelf-stable. Conveniently, the alcohol is removed through evaporation at low temperatures, such as temperatures between 40° and 70° C.

The membranes which are prepared according to this process are symmetrical and self-supporting, and have a thickness of between about 50 and 300μ, preferably of about 100μ. Furthermore, they display high flexibility.

A special characteristic of these membranes is their ability to be welded, i.e., utilizing welding temperatures of between about 180° and 200° C.

In order to measure the filtration capacity of these membranes as used for plasmapheresis a special plasmapheresis cell is employed having defined flow rates, with a membrane surface of 45 cm$^2$, a transmembrane pressure of 100 mmHg, and a blood flow of 100 ml/minute at 20° C., in the following manner.

Blood having a hematocrit of 25% and a total protein concentration of 70 gram/liter was employed. The measured value, i.e., the permeate per time, pressure and surface was 10 ml/minute. The retaining capacity for, for Example 1, factor VIII (molecular weight $2 \times 10^6$) was about 5% under these conditions.

The present invention is further illustrated by the following examples.

EXAMPLE 1

Seven percent of a polycarbonate obtained through polycondensation between bisphenol A and polyethylene glycol (PEG) 5000 (in a ratio of 6.5:3.5), was dissolved in 90% 1,3-dioxalane at room temperature, mixed with 3% PEG 10000, filtered through a 2μ filter, and degassed under vacuum. The solvent viscosity was 1000 cP at 20° C. The polymer solution, as case on a smooth surface, was transported through a methanol/DMF-bath (at a ratio of 1:1) at 20° C., and residence times of at least 1 minute were used. While still on that surface, the gelled polymer layer was transported sequentially through wash baths with water at 20°, 40° and 60° C. The membrane was then removed from the smooth surface.

The membrane prepared according to this example had the following characteristics:
Filtration for water (20° C., 0.1 bar): 3 ml/sec. x at x cm$^2$
Retention capability for factor VIII: 5%
Permeability to albumin 68000: 100%
Retention capability for total protein: 0%

EXAMPLE 2

Six percent polycarbonate was dissolved in 90% 1,3-dioxalane at room temperature, mixed with 4% pluriol 6800 (polypropylene-polyethylene oxide block polymer), filtered and degassed. The solution was cast on a belt, transported through a DMSO/methanol-bath (at a ratio of 1:1), and thereafter through a water bath at 20° C.

The membrane prepared according to this example had the following characteristics:
Filtration for water (0.1 bar): 0.1 ml/sec. x at x cm$^2$
Retention capability for factor VIII: 30%
Permeability to albumin 68000: 100%
Retention capability for total protein: 20%

EXAMPLE 3

Seven percent of the polycarbonate obtained through polycondensation between bisphenol A and PEG 5000 (at a ratio of 6.5:3.5), was dissolved in 90% 1,3-dioxalane at room temperature, mixed with 3% PEG 10000, filtered over a 2μ filter and degassed under vacuum. The solvent viscosity was 1000 cP at 20° C. The solution, as case on a belt, was then transported through a DMSO/methanol-bath (at a ratio of 2:1), and the residence time in the bath was at least 2 minutes. The so cast and gelled polymer layer was then transported through a water bath at 25° C.

The membrane prepared according to this example had the following characteristics:
Filtration for water (0.1 bar): 0.1 ml x sec. x at x cm$^2$
Retention capability for factor VIII: 80%
Permeability to albumin 68000: 70%
Retention capability for total protein: 30%

The present membrane is intended for use in plasmapheresis, i.e., a blood separation procedure in which whole blood is separated into blood cells and plasma by contacting the whole blood with one side of these membranes, wherein the blood cells and plasma by contacting the whole blood with one side of these membranes, wherein the blood cells are retained on that one side while the plasma penetrates through the membrane and is collected on the other side thereof. This separation is conducted, under the influence of a pressure gradient which is maintained between the two sides of the membrane.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What is claimed is:

1. A plasmapheresis membrane of a biocompatible hydrophilic polycarbonate polymer comprising a polycondensate of bisphenol A and polyalkylene oxide having the following general formula:

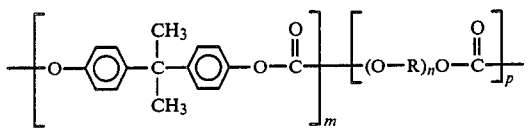

wherein R is selected from the group consisting of —CH$_2$CH$_2$— and combinations of —CH$_2$CH$_2$CH$_2$— and —CH$_2$CH$_2$—, m is from 40 to 100, n is from 10 to 155, and p is from 0.5 to 3, said membrane having a symmetrical, microporous regular pore structure comprising smoothly rounded pore openings substantially free of sharp edges, substantially all of said pores of said membrane having an average pore diameter of between 0.01 and 0.8μ, said membrane being permeable by molecules of up to about 3×10$^6$ Dalton, and having a porosity of greater than 65%, whereby said membrane is capable of providing a high filtration rate for plasma while simultaneously rejecting blood cells without substantially decreasing its permeability capacity and without causing hemolysis when used in such plasmapheresis processes.

2. The plasmapheresis membrane of claim 1 wherein said membrane has an average pore diameter of between 0.1 and 0.8μ.

3. The plasmapheresis membrane of claim 1 or 2 wherein R comprises —CH$_2$CH$_2$— and said polyalkylene oxide has a molecular weight of between 600 and 20,000.

4. The plasmapheresis membrane of claim 1 or 2 wherein said polyalkylene oxide is present in an amount of between 5 and 40%.

5. The plasmapheresis membrane of claim 4 wherein R comprises —CH$_2$CH$_2$— and said polyalkylene oxide has a molecular weight of between 600 and 20,000.

6. The plasmapheresis membrane of claim 4 wherein said polyalkylene oxide is present in an amount of about 35%.

7. The plasmapheresis membrane of claim 6 wherein R comprises —CH$_2$CH$_2$— and said polyalkylene oxide has a molecular weight of between 600 and 20,000.

8. The plasmapheresis membrane of claim 1 or 2 having a thickness of between 50 and 300μ.

9. The plasmapheresis membrane of claim 8 having a thickness of about 100μ.

10. The plasmapheresis membrane of claim 2 having an average pore diameter of about 0.6 μm.

* * * * *

UNITED STATES PATENT AND TRADEMARK OFFICE
CERTIFICATE OF CORRECTION

PATENT NO. : 4,608,172

DATED : August 26, 1986

INVENTOR(S) : Herman J. Goehl, Reinhold J. Buck

It is certified that error appears in the above-identified patent and that said Letters Patent is hereby corrected as shown below:

Column 4, lines 29 and 30, "$-CH_2-CH_2-CH_2-$ and $-CH_2-CH_2-$" should read -- $-CH_2CH_2CH_2-$ and $-CH_2CH_2-$ --

Column 4, line 31, "$-CH_2CH_2$" should read -- $-CH_2CH_2-$ --

Signed and Sealed this

Tenth Day of February, 1987

Attest:

DONALD J. QUIGG

Attesting Officer          Commissioner of Patents and Trademarks